UNITED STATES PATENT OFFICE.

RUDOLF TORNYAY-SCHOSBERGER, OF BUDAPEST, AUSTRIA-HUNGARY.

PROCESS OF MANUFACTURING CEMENT.

954,658.  Specification of Letters Patent.   Patented Apr. 12, 1910.

No Drawing.   Application filed March 1, 1909.  Serial No. 480,672.

*To all whom it may concern:*

Be it known that I, RUDOLF TORNYAY-SCHOSBERGER, residing at Budapest, in the Empire of Austria-Hungary, a subject of the King of Hungary, have invented new and useful Improvements in Processes of Manufacturing Cement, of which the following is a specification.

My invention relates to a process of manufacturing cement from a waste product of the beet sugar industry.

The object of my invention is the manufacturing of different varieties of cements, possessing the highest qualities and a perfect uniformity, by converting the caustic lime which is used in the manufacturing of beet sugar for clearing the sugar-juices, and which forms at present as saturation-slime a low-grade waste product of the sugar refining process, into cement and to this end I add materials containing silicates to the caustic lime in a quantity corresponding to the percentage of silicates contained in the raw material of the cement. It is possible to employ the saturation-slime for the manufacturing of cement by drying and pulverizing it, mixing it with substances containing silicates and finally shaping and burning the mass. This process, however, is not very economical, because the pulverizing of the dried saturation-slime and the following mixing with the silicates is considerably expensive. According to my invention the substances containing silicates are not added to the dried saturation-slime, but directly to the sugar-juices which are mixed with caustic lime whereby the saturation-slime will possess already when separated a composition required for the manufacturing of cement. The silicates either may be brought directly into the saturator containing the sugar-juice which has been already mixed with lime water, or they may be mixed with the lime-water before it is added to the sugar-juices. By the process of saturation with carbonic acid a thorough and perfect mixing of the materials takes place, such as could not, by far, be obtained by any of the processes of manufacturing cement known up to this time, neither by the dry, nor by the so-called wet processes. The fact that the mixing is effected in a pretty thin liquid, is very favorable for obtaining a good result. The saturation-mud, containing the silicates, which is separated by the saturation with carbonic acid and thereupon filtered in a suitable manner, possesses already such a percentage composition, that after the following burning a cement of the required variety results without further steps. It is evident, that by this way cement of different varieties, such as Portland cement, Roman cement, and slag cement may be manufactured.

The process is carried out in the following manner: To the lime-water which is to be used for the clearing of the beet-sugar juices a silicate of such a quality and in such a quantity is added, that it corresponds to the known composition of the cement desired, for instance of Portland-cement; the mass obtained is a paste which is added to the juice in a quantity proper for the content of sugar. During the saturation-process following this step, the mass is very thoroughly mixed by the gas (carbonic acid) which is passed through it and therefore the separated saturation-mud contains the substances necessary for the production of cement finely dispensed and closely mixed with each other. The addition of substances containing silicates to the sugar juices containing lime in no way impairs the clearing of the sugar-juices. On the contrary, it even permits of working juices from beets which have begun to rot, without any objection, whereas the working of such juices offers, as known, difficulties by the usual treatment with lime. After the saturation process the mud is pressed in filter presses in a well-known manner and may thereupon directly be burned without previously forming it, as the mud-cakes coming from the filter presses crumble by themselves into small pieces of the size of peas or hazelnuts. No forming is therefore necessary and moreover every burned charge is altogether equally and perfectly done. The cement, for instance Portland cement produced according to my process is a very high-grade product.

I claim—

1. The process of manufacturing cement, which consists in adding silicates to the caustic lime used for the clearing of the sugar-juices in the manufacture of beet sugar, saturating the mixture of lime, silicates and sugar juices produced with carbonic acid, removing the liquid from the saturation mud, burning said mud, and pulverizing the product obtained, the silicates being added in such a percentage quantity that cement is obtained without further steps.

2. The process of manufacturing cement, which consists in adding materials containing silicates to the caustic lime used for the clearing of the sugar-juices in the manufacture of beet sugar, saturating the mixture of lime, silicates and sugar juices produced with carbonic acid, removing the liquid from the saturation mud, burning said mud, and pulverizing the product obtained, the silicates being added in such a percentage quantity that cement is obtained without further steps.

3. The process of manufacturing cement, which consists in adding silicates to the lime water used for the clearing of sugar juices in the manufacture of beet sugar, adding the resulting mixture to the sugar juices, saturating the liquid mixture thus produced with carbonic acid, removing the liquid from the saturation mud obtained, burning said mud, and finally pulverizing the product obtained to cement without further steps.

4. The process of manufacturing cement, which consists in adding materials containing silicates to the caustic lime used for the clearing of the sugar-juices in the manufacture of beet sugar, before said lime is brought into the sugar juices, saturating with carbonic acid the mixture produced by adding said lime and silicate containing materials, removing the liquid from the saturation mud obtained, burning said mud, and finally pulverizing the product obtained to cement.

In testimony whereof I affix my signature in presence of two witnesses.

RUDOLF TORNYAY-SCHOSBERGER.

Witnesses:
MICHAEL TOMOR,
ALFRED W. DONEGAN.